United States Patent [19]

Henn

[11] Patent Number: 4,939,822
[45] Date of Patent: Jul. 10, 1990

[54] FASTENING ELEMENT

[76] Inventor: Klaus Henn, A-3352 St. Peter der Au, Engstetten, Austria, 48

[21] Appl. No.: 295,310

[22] PCT Filed: Apr. 8, 1988

[86] PCT No.: PCT/AT88/00019
§ 371 Date: Dec. 5, 1988
§ 102(e) Date: Dec. 5, 1988

[87] PCT Pub. No.: WO88/08098
PCT Pub. Date: Oct. 20, 1988

[30] Foreign Application Priority Data
Apr. 10, 1987 [AT] Austria .................................. A909/87

[51] Int. Cl.$^5$ ............................................. F16L 33/02
[52] U.S. Cl. ........................................ 24/271; 24/273; 24/20 R
[58] Field of Search ................. 24/20 R, 20 TT, 273, 24/270, 271, 272, 68 D, 68 F, 68 T, 19

[56]         References Cited
U.S. PATENT DOCUMENTS

| 290,351 | 12/1883 | Parry ...................................... 24/273 |
| 747,811 | 12/1903 | Walker ................................ 24/273 X |
| 1,013,165 | 1/1912 | Hunt ...................................... 24/271 |
| 1,594,467 | 8/1926 | Philbrook .............................. 24/271 |
| 2,865,070 | 12/1958 | Suchter . |
| 3,228,083 | 1/1966 | Gardner, Sr. et al. ................ 24/271 |
| 4,340,996 | 7/1982 | Starace ................................. 24/20 R |
| 4,803,758 | 2/1989 | Calmettes ........................... 24/20 R |

FOREIGN PATENT DOCUMENTS

| 910563 | 6/1946 | France ................................... 24/273 |
| 510205 | 8/1971 | Switzerland . |
| 1231757 | 5/1971 | United Kingdom . |

Primary Examiner—James R. Brittain
Attorney, Agent, or Firm—Kurt Kelman

[57]            ABSTRACT

A fastening device is manufactured of a strip of sheet material and comprises a flexible tongue capable of being looped around an element to be fastened and a holding part. The tongue has a hook-shaped free end and an end opposite to the hook-shaped free end, and the holding part projects at an angle from the opposite tongue end and is bendable towards the tongue along a folding line adjacent the opposite tongue end. The holding part is integral with the tongue and has a hook-up edge spaced from the tongue end and arranged to be engaged by the hook-shaped free end when the flexible tongue is looped around the element to be fastened, and it is operable as a lever upon bending the holding part towards the tongue along the folding line for tightening and closing the fastening device when the tongue is looped around the element to be fastened and the hook-up edge of the holding part has been engaged by the hook-shaped free end of the tongue.

7 Claims, 3 Drawing Sheets

FASTENING ELEMENT

The invention relates to a fastening element, in particular a pipe clamp produced from a strip of material, preferably a strip of sheet metal, with a flexible tongue looping around the one or several objects to be fastened, and a holding part connected therewith, into which holding part the free end of the tongue is inserted and anchored, the free end of the tongue being bent over in the form of a hook. The holding part is connected with the tongue and has a hook-up edge spaced from the paint of connection between the tongue and the holding part. The hook-shaped end of the tongue is hooked up with the hook-up edge, and the holding part acts as a lever for closing the fastening element.

Such fastening elements have become known, for example from German published patent disclosure DE-OS No. 28 45 871. In this earlier solution, the holding part is connected with the tongue via a joint comprised of a number of components, and the holding part, furthermore, is formed by a hook articulated on a lever, which hook is disposed in an above-dead point position when the fastening element is in the closed position.

The drawback of this solution lies in its relatively complicated structure and high manufacturing cost. Furthermore, when the holding part is in the closed position, it needs to be lifted only slightly for causing the fastening element to snap open. This may also easily occur if the lever is touched unintentionally.

The object of the invention is to avoid these drawbacks and to provide a fastening element of the type specified above that is marked by its simple structure and with which an unintentional opening of the element is largely excluded. Furthermore, the fastening element of the invention can be manufactured in a simple way from both plastic material and metal, in particular from sheet metal.

According to the invention, this is accomplished with a holding part which protrudes from the tongue at a fixed angle preferably amounting to 90°, and is integral with at least part of the tongue.

In this way, it is possible to hook the tongue into the holding part after is has been looped around the objects to be held, and to subsequently bend the holding part down, which places the tongue tightly around the elements to be fastened, compressing the latter. Due to the lever action of the holding part, this can be accomplished with relatively little force on part of the user. Furthermore, this permits using the fastening elements according to the invention without requiring any tools.

In addition, closing the fastening element of the invention leads to a plastic deformation of the material that can be reversed only with a corresponding application of force, so that an unintentional opening of the fastening element is excluded.

In order to assure that the tongue is fully and tightly resting against the elements to be fastened, for example tubes or the like over the greatest possible angular range, the holding part may define an opening having a width slightly greater than the width of the tongue and extending from the point of connection or bending point between the tongue and the holding part up to the hook-up edge, which preferably is arranged on a web bridging the aperture, the portion of the tongue adjacent the area in which the tongue is connected with the holding part preferably being widened and the aperture in the holding part extending into this widened tongue portion.

In this way, the end of the tongue hooked into the holding part can rest on the tongue or on the elements to be fastened also within the area of the bent holding part, the latter resting on the tongue too, which results in a solid and slip-free support.

So as to prevent the holding part from being bent back under the influence of the tensile forces acting on the tongue without having to make provision for separate safety means, provision may be readily made that the holding part has a weak point slightly spaced from the area of connection with the tongue, which permits bending down the holding part by hand.

The result of these measures is that when the holding part is in its clamping position, i.e., bent over, the hook-up point of the tongue is closer to the surface of the elements to be fastened than the bending edge of the holding part, around which folding edge the section of the holding part hooked up with the tongue is bent. In this way, the section of the holding part that is hooked up with the tongue is disposed in an above-dead point-position when such holding part is in its clamping position, which safely prevents the fastening element from opening due to the tensile forces applied to it.

In this connection, provision may be made, furthermore, that the weak point extending parallel with the bending edge between the tongue and the holding part is fixed within the zone of the holding part by U-shaped legs protruding from the flat holding part, such legs extending up to the bending edge with the tongue, and that, furthermore, provision is made for a thickening of the holding part on the side of the tongue averted from the bending edge, if need be. The bending edge in clearly fixed in the holding part in a simple way by the legs protruding in the form of a "U".

Furthermore, with a fastening element of the invention manufactured from a strip of sheet metal, provision may be readily made that the thickening of the holding part is formed by areas of the cut sheet metal that are folded over. Such thickenings can be produced in a particularly simple way.

With a preferred embodiment of the invention, provision is made that a reinforcement is arranged within the area of connection of the tongue with the holding part, such reinforcement offering higher resistance to a deflection of the tongue in the direction of the holding part.

With a fastening element made from a strip of sheet metal, its fastening function can be made safe in a simple manner by flaps bent off the area of the tongue adjoining the bending point, whereby such flaps grip around the holding part, the latter being bent off the tongue.

According to a preferred embodiment, the fastening element of the invention is made from metal but it can be produced from plastic material as well, in which case the outwardly bent legs for fixing the bending edge in the zone of the holding part can be dispensed with, as the same effect can be obtained also with a weakened zone of the material thickness, such weakened zone being arranged spaced from the point where the tongue is connected with the holding part.

According to another feature of the invention, the tongue may be divided into two parts, the two parts of the tongue having wings in their one end zones, such wings projecting at an angle laterally from their longitudinal edges and partly extending across the other part of the tongue, one of the two parts preferably having sawtooth-shaped teeth and the other part of the tongue having recesses or openings for receiving such teeth.

In this way, the length of the tongue can be easily adapted to the given requirements and it is not necessary to manufacture a great number of fastening elements with different tongue lengths, which significantly simplifies the stockkeeping.

In this connection, the clear spacing between each part of the tongue and its wings extending across the other part of the tongue may be made greater than the thickness of the other part of the tongue plus the free height of the teeth.

This permits changing the length of the tongue, i.e., reducing and increasing the length of the tongue in any desired sequence.

In a preferred embodiment of the invention, the tongue or its parts may have holes for increasing the flexibility of the tongue.

The invention is explained in greater detail in the following by reference to the drawing, in which.

Figure 1:
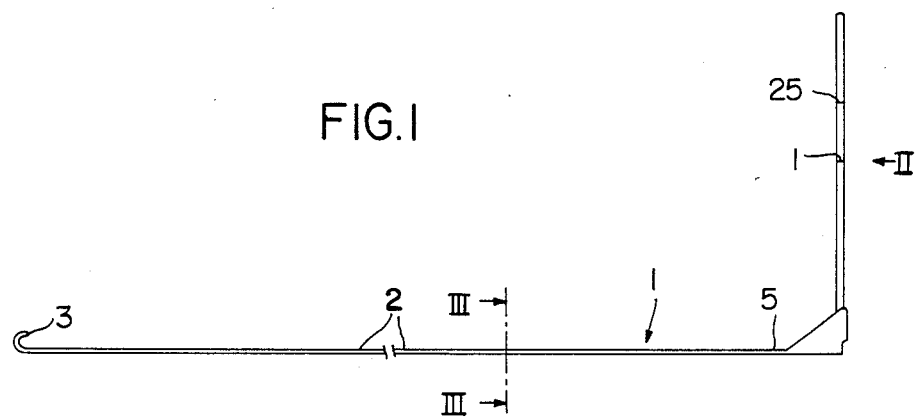
FIG. 1 shows a side elevation of an opened fastening element according to the invention.
Figure 2:
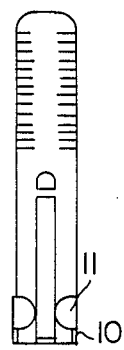
FIGS. 2 and 3 show respective end views of the fastening element in the directions of arrows II and III.

The fastening element 1 according to the invention has a tongue 2 connected to a holding part 25 and having its free end 3 bent in the form of a hook.

The holding part 25 has a slot 4 extending into the widened area 5 of the tongue 2 and, within the area of the holding part 25, slot 4 is divided by a bridge 6 having a hook-up edge 7 for the hook 3 of the tongue 2.

The holding part 25 is integral with the tongue 2 and encloses with the tongue an angle of preferably 90 degrees when in the condition ready for use (see FIG. 1).

Figure 3:
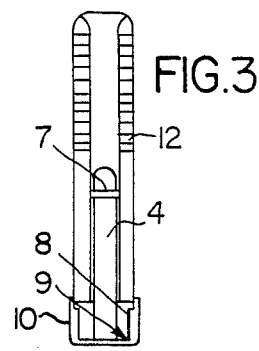
Figure 4:
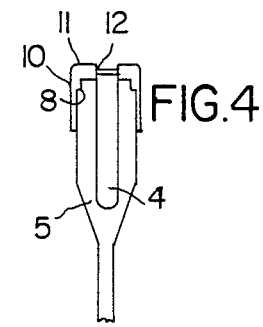
FIG. 4 is a fragmentary top view of a fastening element according to the invention.

As shown in FIGS. 3 and 4, adjoining the bending edge between the holding part and the tongue, legs 8 are bent from the holding part 25, and supported on the tongue 2 to prevent further bending of the holding part along bending edge 9.

At the bending edge 9, flaps 10 are bent from the tongue and engage the bent-up holding part with their extensions 11. The latter prevent the tongue from bending in the direction of the holding part, so that said components or parts cannot be brought into their stretched position.

Above the legs 8 and remote from the bending edge 9, the holding part has wings 12 folded over onto the inside of the latter in order to form a reinforced zone, which also results in a weakened point in the holding part between the legs 8 and the zone reinforced by the folded wings, such weakened part extending parallel to the bending edge and being spaced from the latter, so that the part or area of the holding part 25 having the bridge 6 can be bent down.

Figure 5:
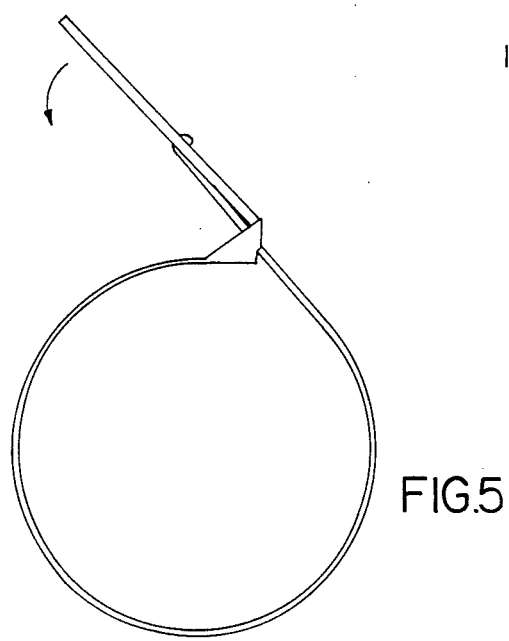
FIG. 5 shows a fastening element of the invention in its partly closed condition.

FIG. 5 shows that the hook-shaped end 3 of the tongue 2 is hooked onto the bridge 6, whereupon the holding part 25 can be bent down in the direction of the portion of the tongue adjoining the holding part. This tightens or tensions the tongue, which increasingly presses itself against the elements, for example pipes or bars to be joined or held together.

Figure 6:
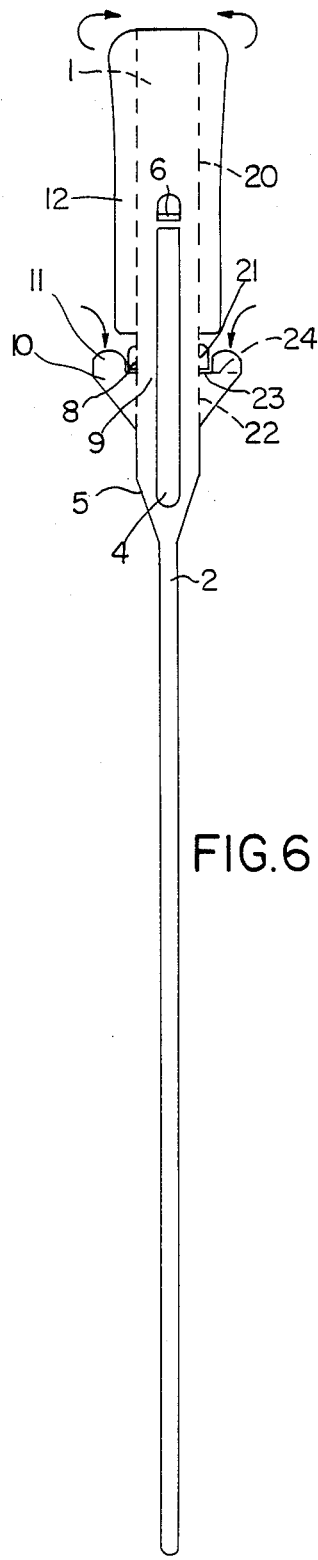
FIG. 6 shows a blank for manufacturing a fastening element according to the invention.

FIG. 6 shows a blank of material for producing a fastening element of the invention. In the manufacture of such a fastening element, the legs 8 are bent up jointly with the wings 12 along the bending edges 20, 21 indicated by dashed lines, whereupon the wings 12 are bent further inwardly and pressed together with the remaining holding part 25. In this connection, grooves may be embossed in these elements, which permits said sections to be pressed together even more tightly and prevents rebounding.

Furthermore, the flaps 10 of the tongue 2, too, are bent up along the bending edges 22, and the holding part 25 is bent up along the extension of the two small cuts 23 until the legs, which are already bent up, stand on the tongue 2. Thereafter, the extensions 11 of the flaps are bent along the bending edges 24 around the holding part set at an angle, and the free end of the tongue 2 is bent up to form a hook.

Figure 7:
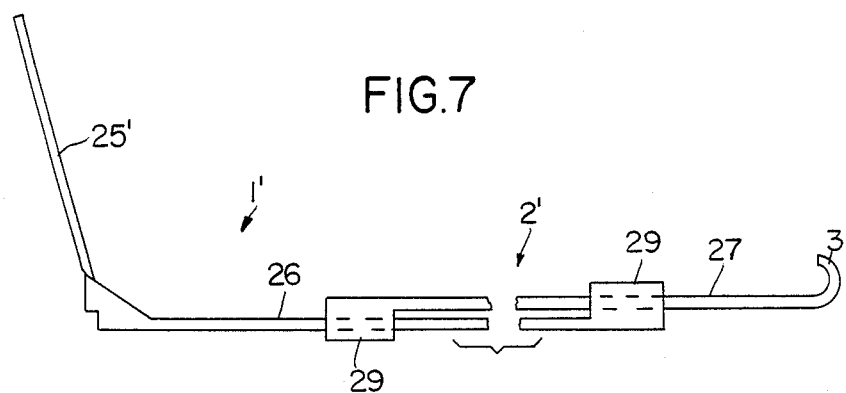
FIG. 7 shows another embodiment of a fastening element according to the invention, in which the tongue is comprised of two parts.

FIG. 7 shows another embodiment of the fastening element 1' of the invention. In this fastening element, the tongue 2' is divided into two parts, permitting varying its length within certain limits. Furthermore, the tongue 2' has substantially the same width as the holding part 25', the latter being integral with the part 26 of the tongue 2'. This part 26, as the part 27, which has its free end 3 shaped in the form of a hook, has holes 28 for enhancing the flexibility.

Figure 8:
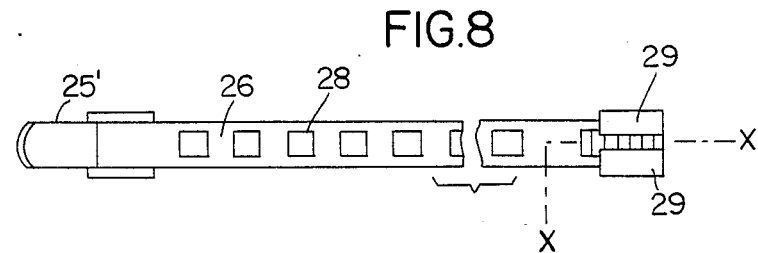
FIGS. 8 and 9 show the two parts of the fastening element according to FIG. 7.

The adjoining ends of the parts 26 and 27 of the tongue 2', have wings 29 arranged on their longitudinal edges (FIGS. 8 and 9) engaging the other part 26, 27 of the tongue 2', with the result that the two parts of the tongue 2' guide one another.

Figure 10:
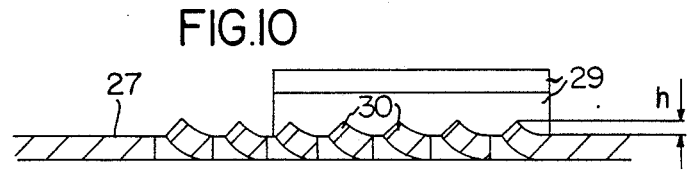
FIG. 10 is a sectional view along line X—X in FIG. 8, shown on an enlarged scale.

As shown in FIG. 10, teeth 30 are arranged alongside wings 29 of the part 26 of the tongue 2' integral with the holding part 25', such teeth being formed by punching out parts of the material of this part and substantially having the shape of sawteeth.

Figure 9:
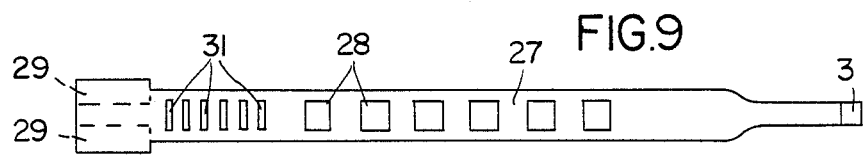

Said teeth 30 cooperate with slots 31 arranged across the entire adjustment range of the tongue 2' on the part 27 whose free end 3 has the shape of a hook (FIG. 9).

The clear spacing of the top side of each part 26, 27 of the tongue 2' from the sides of the wings 29 facing the latter is at least equal the thickness of each part 26, 27 of the tongue 2', plus the height h by which the teeth 30 project from the part 26 of the tongue 2'. In this way, the two parts 26, 27 of the tongue 2' can be selectively brought to overlap each other more or less, with a change being possible in both directions.

If the tongue has been looped about the elements to be fastened, for example tubes, with the part 26 of the tongue 2' directly resting against such tube or the like, the free end of such part having the wings 29 tends to move outwardly, which results in a safe engagement of the teeth 30 in the slots 31 of the part 27 of the tongue 2'. Due to the contact pressure applied by the outer part 27 of the tongue 2', such part being radially outward relative to the objects or elements about which the fastening element 1' is looped, the engagement of the teeth 30 in the slots 31 is enhanced further as the fastening element is being tensioned by means of the holding part 25', which safely prevents the two parts 26, 27' of the tongue 2' from sliding apart.

Basically it is possible also to dimension the clear spacing h of the insides of the wings 29 from the corresponding top side of the parts 26, 27 in such a way that the clear spacing is elastically widened when the length of the tongue 2' is reduced by displacing the parts 26, 27 against each other accordingly. In this case, the clear spacing amounts to less than the sum of the thickness of each part 26, 27 of the tongue 2' and the height h of the teeth. At their front and back sides, the teeth may have a different pitch or inclination against the top side of the part 26, which facilitates pushing the parts 26 and 27 together. In such a case, however, the length of the tongue 2' can only be reduced, but not increased thereafter.

What is claimed is:

1. A fastening device manufactured of a strip of sheet material and comprising
    (a) a flexible tongue capable of being looped around an element to be fastened, the tongue having
        (1) a hook-shaped free end,
        (2) an end opposite to the hook-shaped free end, and
        (3) a widened portion adjacent the opposite end, and
    (b) a holding part projecting at an angle from the opposite tongue end and being bendable towards the tongue along a folding line adjacent the opposite tongue end, the holding part being integral with the tongue and
        (1) having a hook-up edge spaced from the opposite tongue end and arranged to be engaged by the hook-shaped free end when the flexible tongue is looped around the element to be fastened,
        (2) defining an elongated aperture having a width slightly exceeding the width of the tongue and extending from the folding line towards the hook-up edge into the widened tongue portion, the hook-up edge being constituted by a web bridging the elongated aperture, and
        (3) being operable as a lever upon bending the holding part towards the tongue along the folding line for tightening and closing the fastening device when the tongue is looped around the element to be fastened and the hook-up edge of the holding part has been engaged by the hook-shaped free end of the tongue.

2. The fastening device of claim 1, wherein the holding part has a weakened portion slightly spaced from the opposite tongue end whereby manual bending of the holding part towards the tongue is facilitated.

3. The fastening device of claim 2, wherein the folding line and the weakened portion extend parallel to each other transversely to the tongue and holding part, and further comprising a pair of legs projecting substantially perpendicularly from the longitudinal edges of the holding part, extending along a portion of the holding part between the folding line and the weakened portion and being supported on the widened portion of the tongue whereby bending of said holding part portion is prevented, and the longitudinal edges of the holding part remote from the folding line being thickened.

4. The fastening device of claim 3, wherein the holding part has folded-over wings extending along the longitudinal edges thereof remote from the folding line whereby said longitudinal edges are thickened.

5. The fastening device of claim 3, wherein the flexible tongue has a pair of flaps projecting substantially perpendicularly from the longitudinal edges of the flexible tongue at the opposite end thereof, each flap having an extension folded over, and engaging said holding part portion.

6. A fastening device manufactured of a strip of sheet material and comprising
    (a) a flexible tongue capable of being looped around an element to be fastened, the tongue being comprised of
        (1) a first part having a hook-shaped free end and
        (2) a second part having an end opposite to the hook-shaped free end,
        (3) adjoining ends of the tongue parts between the free and opposite ends having bent-over wings, the bent-over wings of each pat overlapping the other part whereby the two tongue parts are telescopingly movable for respective extension and reduction of the length of the tongue,
        (4) one of the tongue parts having teeth and the other part defining holes for engaging the teeth, and
    (b) a holding part projecting at an angle form the opposite tongue end and being bendable towards the tongue along a folding line adjacent he opposite tongue end, the holding part being integral with the tongue and
        (1) having a hook-up edge spaced from the opposite tongue end and arranged to be engaged by the hook-shaped free end when the flexible tongue is looped around the element to be fastened, and
        (2) being operable as a lever upon bending the holding part towards the tongue along the folding line for tightening and closing the fastening device when the tongue is looped around the element to be fastened and the hook-up edge of the holding part has been engaged by the hook-shaped free end of the tongue.

7. The fastening device of claim 6, wherein the spacing between each bent-over wing and the tongue part it overlaps exceeds the sum of the thickness of the overlapped part and the height of the teeth.

* * * * *